Nov. 8, 1960 J. V. SIMEK ET AL 2,959,051
WELD STRENGTH TESTING DEVICE
Filed Dec. 31, 1956 2 Sheets-Sheet 2
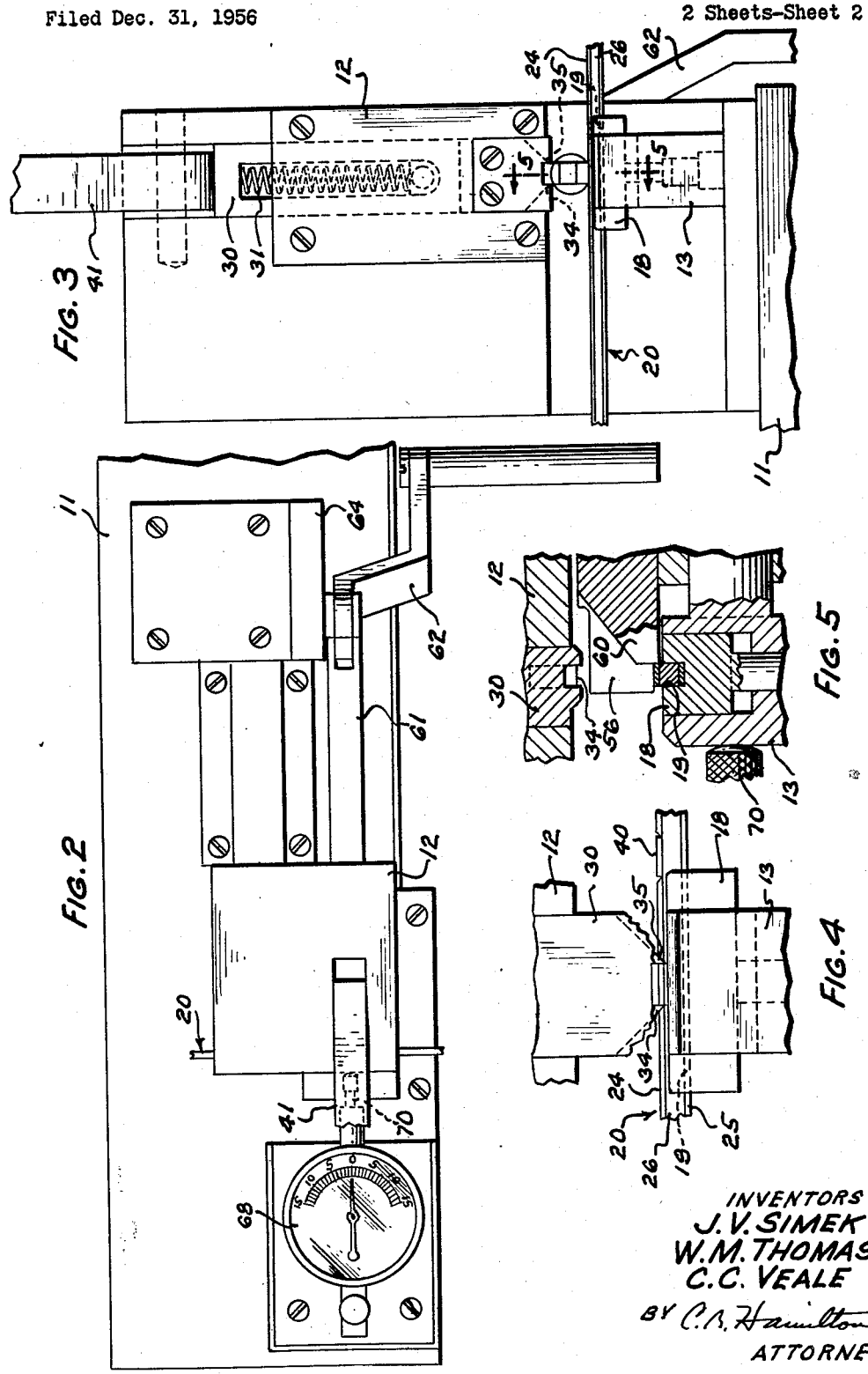
INVENTORS
J. V. SIMEK
W. M. THOMAS
C. C. VEALE
BY C. B. Hamilton
ATTORNEY

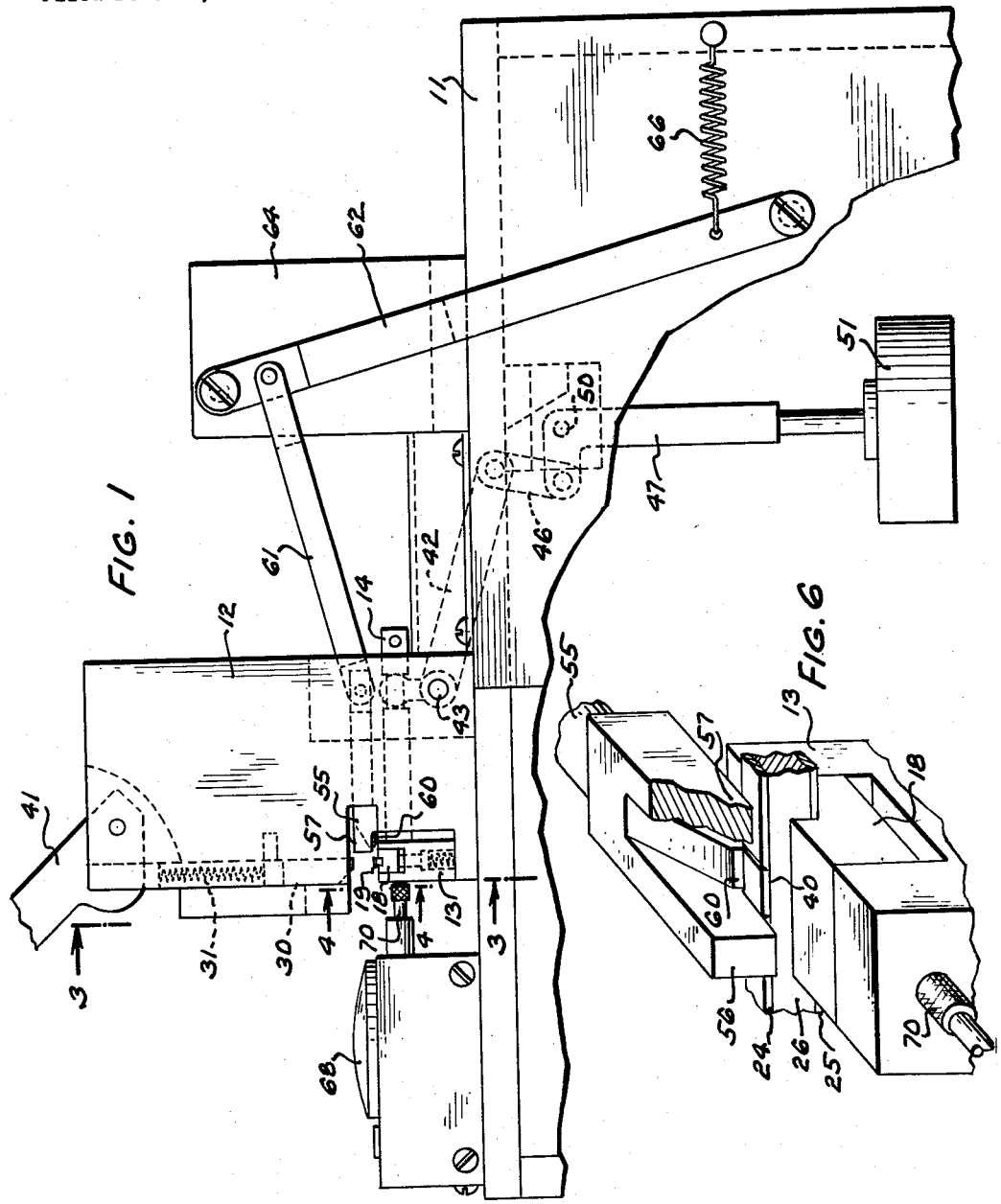

2,959,051
WELD STRENGTH TESTING DEVICE

Jerry V. Simek, Berwyn, Walter M. Thomas, Oak Park, and Charles C. Veale, West Chicago, Ill., assignors to Western Electric Company, Incorporated, New York, N.Y., a corporation of New York Filed Dec. 31, 1956, Ser. No. 631,632

5 Claims. (Cl. 73—101)

This invention relates to weld testing devices and more particularly to devices for testing the mechanical strength of welds between metallic strips.

In the testing of the mechanical strength of welds, it has been a prior practice to secure clamps to each of a pair of elements welded together and apply a force of shearing magnitude to one of the clamps while holding the other against movement. This has not always been satisfactory since it is sometimes desirable to test the mechanical strength of a weld between two elements, one of which is of a size or shape not easily held in a clamp. With this fact in mind, one of the objects of this invention is to provide a weld testing device wherein a jaw holds a larger or more easily clamped element of a pair of elements welded together and a member engages a smaller or less easily clamped element of the pair to apply a shearing force thereto.

Another object of this invention is to provide a device for testing welds between two strips which are welded together to form a tape of contact material.

A further object of this invention is to provide a weld testing device wherein a jaw displaceable against a progresively increasing force holds one of a pair of elements welded together and a member applies a force of shearing magnitude to the other element of the pair, the force necessary to break the weld being represented by the displacement of the jaw when the weld breaks.

A still further object of this invention is to provide a device for testing the mechanical strength of a weld between a thin strip and a heavy strip held in a jaw wherein a cutter severs the thin strip to isolate a portion of it from the remainder thereof and a member movable relative to the jaw engages the isolated portion for shearing it from the heavy strip.

One embodiment of the present invention may include a jaw for holding a heavy strip to which a thin strip is welded and a cutter for severing the thin strip to isolate a portion of it. A ram engages the isolated portion of the thin strip to displace it and the jaw against a progressively increasing force applied to the jaw. The breaking strength of the weld is represented by the displacement of the jaw at the time the weld breaks.

Other objects and advantages of the invention will become apparent by reference to the following detailed description and the accompanying drawings illustrated a preferred embodiment of the invention, in which Fig. 1 is a fragmentary elevational view of the device showing the general arrangement of the various elements embodying the principal features of the invention;

Fig. 2 is a fragmentary plan view of the device showing the dial indicator used to measure displacement of the tape-holding jaw;

Fig. 3 is an enlarged fragmentary view taken on line 3—3 of Fig. 1 showing the cutter mounted on the frame;

Fig. 4 is an enlarged fragmentary view taken on line 4—4 of Fig. 1 showing the blades of the cutter and also showing cuts made in the strip by the blades;

Fig. 5 is an enlarged fragmentary cross-sectional view taken along line 5—5 of Fig. 3 showing a hold-down lug and the shearing lug of the ram in engagement with the tape; and Fig. 6 is an enlarged fragmentary perspective view of the working end of the ram in engagement with the tape held in the jaw.

Referring now in detail to the drawings, a base 11 is shown supporting a frame 12 upon which is slidably mounted a jaw carrier 13 having a shaft 14 (Fig. 1) extending through the frame 12. The jaw carrier 13 has resiliently mounted thereon a jaw 18 having a slot 19 therein for receiving and holding a contact tape 20 consisting of thin, precious metal strips 24 and 25 welded to opposite sides of a base metal strip 26 which is substantially thicker than the precious metal strips 24 and 25. The tape 20 is a well-known type which is cut into short lengths that serve as relay contacts.

A cutter 30, slidably mounted in the frame 12 and urged in an upward direction by a spring 31, is provided with blades 34 and 35 for severing the precious metal strip 24 at two places simultaneously to leave a portion 40 (Figs. 4 and 6) of the strip 24 isolated from the remainder thereof. A lever 41 (Figs. 1, 2 and 3) pivoted to the frame 12 engages the upper end of the cutter 30 to move it downward against the action of the spring 31.

The shaft 14 of the jaw carrier 13 is connected to one end of an L-shaped lever 42 (Fig. 1) which pivots on a shaft 43 secured to the frame 12. The other end of the lever 42 is pinned to a link 46 which is in turn pinned to one end of a second L-shaped lever 47 that is pivotally mounted on a shaft 50, secured to a portion of the base 11. The other end of the second L-shaped lever normally depends vertically from the shaft 50 and carries a weight 51 which is lifted when the second L-shaped lever 47 is moved from its normal position.

A ram 55 slidably mounted in the frame 12 is provided with a pair of spaced hold-down lugs 56 and 57 which engage the tape 20 to retain it in the slot 19 in the resiliently mounted jaw 18. A shearing lug 60 carried by the ram 55 and positioned between the hold-down lugs 56 and 57 engages the isolated portion 40 of the strip 24 (Figs. 5 and 6) to shear it from the base metal strip 26. The rear end of the ram 55 is connected by a link 61 to a manually operated lever 62 pivoted to a bracket 64 which is attached to the base 11. A spring 66 (Fig. 1) attached between the lever 62 and the base 11 normally urges the lever 62 and the ram 55 to a retracted position.

A dial indicator 68 of a well-known type which holds its maximum reading until reset is mounted on the base 11 and has an actuating plunger 70 in engagement with the jaw carrier 13 to measure its displacement during the shearing operation.

In operation of the device, a contact tape 20 is manually positioned in the slot 19 in the resiliently mounted jaw 18 and the lever 41 is manually moved to force the cutter 30 downward against the action of the spring 31. The blades 34 and 35 engage the strip 24 and sever it at two places to isolate the portion 40 from the remainder of the strip 24. The lever 41 is then released and the cutter 30 is raised by the spring 31 to a retracted position.

The operator then manually moves the lever 62 against the action of the spring 66 to move the ram 55 into engagement with the tape 20. The hold-down lugs 56 and 57 engage the top surface of the strip 24 to retain the tape 20 in the slot 19, and the shearing lug 60 engages the isolated portion 40 of the strip 24 in the manner best illustrated in Fig. 6. Further movement of the lever 62 forces the jaw carrier 13 to move to the left (Fig. 1) to lift the weight 51 through the system of levers 42 and 47 and the link 46, the lifting force being transmitted from the shearing lug 60 through the weld between the portion 40 and the strip 26 to the jaw 18. As the jaw carrier 13 is displaced further from its normal position, the force necessary to move it becomes progressively greater, since the torque applied to the lever 47 by the weight 51 is progressively increased as the jaw carrier 13 is moved.

As the jaw carrier 13 is moved to the left (Fig. 1) the dial indicator 68 indicates its displacement to represent the force applied to the weld between the portion 40 of the strip 24 and the strip 26. The lever 62 is movement until the weld breaks. The reading of the dial indicator 68 at the time when the weld breaks represents the force necessary to break the weld, the indicator being calibrated to give the value directly.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A weld testing device, comprising a displaceable jaw having a slot therein for receiving and holding one of a pair of articles welded together, a member movable across the jaw and having a portion for engaging and displacing the other article of said pair and the jaw, said member also having a projection thereon extending beyond said portion a distance greater than the width of the slot in said jaw for holding said one article in said slot, means for applying a force to the jaw to resist displacement thereof, and means for measuring the displacement of the jaw.

2. A weld testing device, comprising a base, means on the base for holding one of a pair of elongated articles welded together, means on the base for severing the other element of said pair to isolate a portion thereof, means on the base for applying a force to said isolated portion to displace the articles and the holding means, and means for applying a progressively increasing force to the holding means to resist displacement thereof.

3. A weld testing device, comprising a base, a jaw slidably mounted on the base and having a slot therein for receiving and holding one of a pair of articles welded together, a ram movably mounted on the base and having a shearing lug for engaging the other article of said pair to move the articles and the jaw across the base, said ram having a pair of retainer lugs extending beyond the shearing lug a distance greater than the width of the slot in the jaw for holding said one article in said slot, a weight movably supported by the base, a system of elements interconnecting the weight and the jaw for causing the weight to be lifted when the jaw is displaced, and means for measuring displacement of the jaw.

4. A weld testing device, comprising a base, a jaw carrier slidably mounted on the base, a jaw resiliently supported on the jaw carrier and having therein a slot for receiving and holding one of a pair of articles welded together, a weight supported on the base, a system of elements interconnecting the jaw carrier and the weight in such a way that the weight is lifted and applies a progressively increasing force to the jaw carrier to urge it toward normal position as said jaw carrier is moved from said normal position, a ram mounted on the base and having a portion for engaging the other of said pair of welded articles to displace the articles and the jaw and jaw carrier whereby the weight is lifted, said ram also having a pair of retainer lugs extending beyond the article engaging portion a distance greater than the width of the slot for holding said one article in said slot, and means on the base for indicating the displacement of the jaw carrier from normal position.

5. A weld testing device, comprising a base, a jaw carrier slidably mounted on the base, a jaw resiliently supported on the jaw carrier and having a slot for receiving and holding one of a pair of elongated elements welded together, a cutter mounted on the base for severing the other of said pair of elements to isolate a portion thereof, means for actuating the cutter, a ram mounted on the base and having a pair of spaced lugs for engaging said other element to retain said one element in the slot in the jaw and also having a portion for engaging and applying a force to the isolated portion of said other element to displace the elements and the jaw and jaw carrier from normal position, means for actuating the ram, a weight pivotally supported by and depending from the base, a system of linkages interconnecting the jaw carrier and the weight in such a way that the weight is lifted when the jaw carrier is displaced from normal position, and an indicator having an actuating plunger engaging the jaw carrier for measuring its displacement from normal position.

References Cited in the file of this patent

UNITED STATES PATENTS

| 2,139,527 | Sonntag | Dec. 6, 1938 |
| 2,261,783 | Stull | Nov. 4, 1941 |
| 2,353,056 | Martindell | July 4, 1944 |
| 2,498,265 | Green | Feb. 21, 1950 |
| 2,674,124 | Barrett | Apr. 6, 1954 |

FOREIGN PATENTS

| 110,565 | Germany | May 10, 1900 |